United States Patent
Govorkov et al.

(10) Patent No.: US 6,614,584 B1
(45) Date of Patent: Sep. 2, 2003

(54) LASER FREQUENCY CONVERTER WITH AUTOMATIC PHASE MATCHING ADJUSTMENT

(75) Inventors: Sergei Govorkov, Boca Raton, FL (US); Evgueni Slobodchikov, Lawrenceville, NJ (US)

(73) Assignee: Lambda Physik AG, Goettingen (DE)

(*) Notice: Subject to any disclaimer, the term of this patent is extended or adjusted under 35 U.S.C. 154(b) by 134 days.

(21) Appl. No.: 09/792,622

(22) Filed: Feb. 23, 2001

Related U.S. Application Data
(60) Provisional application No. 60/184,888, filed on Feb. 25, 2000.

(51) Int. Cl.[7] .................... G02F 1/37; H01S 3/109
(52) U.S. Cl. ........................... 359/328; 372/22
(58) Field of Search ................. 359/326–332; 372/21–22

(56) References Cited

U.S. PATENT DOCUMENTS

| | | | |
|---|---|---|---|
| 3,140,451 A | 7/1964 | Fox ............................ | 331/94.5 |
| 3,222,615 A | 12/1965 | Holly ......................... | 331/94.5 |
| 3,663,893 A | 5/1972 | Ostermayer Jr. ............ | 331/94.5 |

(List continued on next page.)

FOREIGN PATENT DOCUMENTS

| | | | | |
|---|---|---|---|---|
| CA | 1303198 | | 6/1992 | ........... H01S/3/085 |
| DE | 2 105 480 | | 8/1972 | ............. H01S/3/16 |
| DE | 2 225 277 | | 12/1973 | ............. H01S/3/11 |
| DE | 42 19 169 | A1 | 6/1992 | ............. H01S/3/10 |
| DE | 689 15 421 | T2 | 9/1994 | ........... H01S/3/094 |
| DE | 44 38 283 | C2 | 4/1997 | ............. H01S/3/08 |
| EP | 0 378 390 | | 7/1990 | ............. H01S/3/23 |
| FR | 1 379 259 | | 12/1963 | |
| FR | 2592530 | | 12/1986 | ............. H01S/3/16 |
| GB | 1 333 892 | | 10/1973 | ............. H01S/3/11 |
| JP | 1-248582 | | 10/1989 | ........... H01S/3/094 |
| JP | 5-259540 | | 10/1993 | ........... H01S/3/094 |

OTHER PUBLICATIONS

Devlin, et al., "Composite Rod Optical Masers," *Applied Optics*. vol. 1, No. 1, Jan. 1962, pp. 11–15.

Grau, et al., "Modulation von Licht Mittels Elektrisch Doppedlbrechender Kristalle," *Zeitschrift für angewandte Physik XVII Band*, Heft 1, 1964, pp. 16–20.

V. Evtuhov, et al., "A 'Twisted–Mode' Technique for Obtaining Axially Uniform Energy Density in a Laser Cavity," *Applied Optics*, vol. 4, No. 1, Jan. 1965, pp. 142–143.

P.W. Smith, "Stabilized, Single–Frequency Output from a Long Laser Cavity," *IEEE J. Quant. Elect.* 1, 343 (Nov. 1965), pp. 343–348.

R. V. Pole, "Active Optical Imaging System," *IBM Technical Disclosure Bulletin*, vol. 7, No. 12, May 1965, pp. 1200.

Park, et al., "Stable Single–Axial–Mode Operation of an Unstable–Resonator Nd:Yag Oscillator by Injection Locking," *Opt. Lett* 5, 96, Mar. 1980, pp. 96–98.

Y. K. Park, et al., "Electronic Linewidth Narrowing for Single Axial Mode Operation of Q–Switched Nd: YAG Lasers," *Optics Communications*, vol. 37, No. 6, Jun. 15, 1981, pp. 411–416.

(List continued on next page.)

*Primary Examiner*—John D. Lee
(74) *Attorney, Agent, or Firm*—Stallman & Pollock LLP

(57) ABSTRACT

A laser system includes a laser source and at least one orientationally adjustable and/or temperature-controlled nonlinear optical crystals. First and second position sensitive detectors respectively detect fundamental and higher frequency harmonic beams. A controller receives signals from the first and second detectors indicative of a phase matching error and controls an orientation and/or a temperature of the crystal based on the signals to substantially a phase matching condition.

16 Claims, 5 Drawing Sheets

U.S. PATENT DOCUMENTS

| | | | |
|---|---|---|---|
| 3,683,296 A | 8/1972 | Scalise | 331/95.5 |
| 3,684,980 A | 8/1972 | Kay | 331/94.5 |
| 3,821,663 A | 6/1974 | Brenner | 331/94.5 R |
| 3,856,056 A | 12/1974 | Filter | 139/291 R |
| 3,858,056 A | 12/1974 | Melamed et al. | 307/88.3 |
| 3,918,007 A | 11/1975 | Waksberg | 331/94.5 M |
| 3,962,576 A | 6/1976 | Kuhl et al. | 250/201 |
| 4,546,477 A | 10/1985 | Richards | 372/12 |
| 4,756,002 A | 7/1988 | Ruggieri et al. | 372/70 |
| 4,794,615 A | 12/1988 | Berger et al. | 372/69 |
| 4,872,177 A | 10/1989 | Baer et al. | 372/75 |
| 4,918,704 A | 4/1990 | Caprara et al. | 372/99 |
| 4,945,544 A | 7/1990 | Tanaka et al. | 372/70 |
| 5,015,054 A | 5/1991 | Chaffee | 350/96.15 |
| 5,033,057 A | 7/1991 | Bosenberg et al. | 372/72 |
| 5,033,058 A | 7/1991 | Cabaret et al. | 372/75 |
| 5,047,668 A | 9/1991 | Bosenberg | 359/330 |
| 5,048,044 A | 9/1991 | Ireland | 372/66 |
| 5,050,173 A | 9/1991 | Hughes | 372/6 |
| 5,053,641 A | 10/1991 | Cheng et al. | 359/330 |
| 5,062,112 A | 10/1991 | Buchman et al. | 372/3 |
| 5,084,886 A | 1/1992 | Martin | 372/36 |
| 5,093,832 A | 3/1992 | Bethune et al. | 372/21 |
| 5,117,436 A | 5/1992 | Hanson | 372/72 |
| 5,140,607 A | 8/1992 | Paiva | 372/70 |
| 5,171,436 A | 12/1992 | Botsch | 210/159 |
| 5,181,223 A | 1/1993 | Baer | 372/69 |
| 5,197,074 A | 3/1993 | Emmons, Jr. et al. | 372/26 |
| 5,206,868 A * | 4/1993 | Deacon | 372/21 |
| 5,349,600 A | 9/1994 | Shinbori et al. | 372/92 |
| 5,365,366 A | 11/1994 | Kafka et al. | 359/330 |
| 5,455,838 A | 10/1995 | Heritier et al. | 372/75 |
| 5,457,707 A | 10/1995 | Sobey et al. | 372/20 |
| 5,488,626 A | 1/1996 | Heller et al. | 372/70 |
| 5,521,932 A | 5/1996 | Marshall | 372/36 |
| 5,521,936 A | 5/1996 | Irwin | 372/75 |
| 5,559,816 A | 9/1996 | Basting et al. | 372/27 |
| 5,572,541 A | 11/1996 | Suni | 372/70 |
| 5,577,058 A | 11/1996 | Kafka et al. | 372/20 |
| 5,590,147 A | 12/1996 | Hobbs et al. | 372/75 |
| 5,606,453 A | 2/1997 | Walling et al. | 359/330 |
| 5,619,517 A | 4/1997 | Dixon | 372/21 |
| 5,619,522 A | 4/1997 | Dubé | 372/72 |
| 5,623,510 A | 4/1997 | Hamilton et al. | 372/75 |
| 5,627,848 A | 5/1997 | Fermann et al. | 372/18 |
| 5,627,850 A | 5/1997 | Irwin et al. | 372/43 |
| 5,638,388 A | 6/1997 | Nigham, Jr. et al. | 372/22 |
| 5,651,020 A | 7/1997 | Nigham, Jr. et al. | 372/92 |
| 5,657,341 A | 8/1997 | Hyuga | 372/98 |
| 5,659,419 A | 8/1997 | Lokai et al. | 359/330 |
| 5,661,738 A | 8/1997 | Yasui et al. | 372/35 |
| 5,663,973 A | 9/1997 | Stamm et al. | 372/20 |
| 5,671,241 A | 9/1997 | Stamm et al. | 372/20 |
| 5,677,920 A | 10/1997 | Waarts et al. | 372/6 |
| 5,774,488 A | 6/1998 | Kmetec | 372/69 |
| 5,774,489 A | 6/1998 | Moulton et al. | 372/75 |
| 5,796,513 A | 8/1998 | Stamm et al. | 359/330 |
| 5,838,701 A | 11/1998 | Deutsch et al. | 372/10 |
| 5,838,712 A | 11/1998 | Kraenert et al. | 372/75 |
| 5,847,861 A | 12/1998 | Kafka et al. | 359/330 |
| 5,854,802 A | 12/1998 | Jin et al. | 372/22 |
| 5,867,324 A | 2/1999 | Kmetec et al. | 359/625 |
| 5,870,421 A | 2/1999 | Dahm | 372/75 |
| 5,875,206 A | 2/1999 | Chang | 372/75 |
| 5,896,220 A | 4/1999 | Stamm et al. | 359/330 |
| 5,898,718 A | 4/1999 | Mohatt et al. | 372/22 |
| 5,905,745 A | 5/1999 | Grubb et al. | 372/6 |
| 5,909,306 A | 6/1999 | Goldberg et al. | 359/341 |
| 5,930,030 A | 7/1999 | Scifres | 359/341 |
| 5,963,363 A | 10/1999 | Weston et al. | 359/345 |
| 5,978,407 A | 11/1999 | Chang et al. | 372/72 |
| 5,987,049 A | 11/1999 | Weingarten et al. | 372/70 |
| 5,995,523 A | 11/1999 | Xie | 372/22 |
| 6,002,695 A | 12/1999 | Alfrey et al. | 372/22 |
| 6,002,697 A | 12/1999 | Govorkov et al. | 372/34 |
| 6,009,114 A | 12/1999 | Heller et al. | 372/75 |
| 6,021,141 A | 2/2000 | Nam et al. | 372/20 |
| 6,026,109 A | 2/2000 | Micke et al. | 372/92 |
| 6,028,870 A | 2/2000 | Deutsch et al. | 372/25 |
| 6,075,803 A | 6/2000 | Bull et al. | 372/75 |

OTHER PUBLICATIONS

A. E. Siegman, "Lasers," University Science Books, Mill Valley, California 1986, pp. 1034–1039.

T. J. Kane, et al., "Frequency Stability and Offset Locking of a Laser–Diode–Pumped Nd:YAG Monolithic Nonplanar Ring Oscillator," *Opt. Lett.*, Mar. 1987, vol. 12, No. 3, pp. 175–177.

Herausgegeben von Heinz Haferkorn, "Lexikon der Optik," *Dausien*, 1988, pp. 357/ (includes German–English Translation).

Hanson, et al., "Laser Diode Side Pumping of Neodymium Laser Rods," *Applied Optics*, vol. 27, No. 1, Jan. 1988, pp. 80–83.

J–C Lee, et al., "$TEM_{00}$–Mode and Single–Longitudinal–Mode Laser Operation with a Cholesteric Liquid–Crystal Laser End Mirror," *Optics Letters*, vol. 15, No. 17, Sep. 1, 1990, pp. 959–961.

J. Liang, et al., "Demonstration of a Tunable Single Longitudinal Mode Q–Switched Solid–State Source Using Injection Seeded Nd:YAP," *Opt. Comm.*, May 1, 1991, vol. 82, No. 5, 6, pp. 509–513.

Welford, et al., "Efficient $TEM_{00}$–Mode Operation of a Laser–Diode Side–Pumped Nd:YAG Laser," *Optics Letters*, vol. 16, No. 23, Dec. 1, 1991, pp. 1850–1852.

J. M. Plorin, et al., "Diode–Pumped, Actively Stabilized 1 W Single–Frequency–Laser for Optical Measurement and Testing," *Laser in der Technik Laser in Engineering*, Laser 91, Springer–Verlag Berlin Heideldberg 1992, pp. 103–107.

Kasinski, et al., "One Joule Output From a Diode–Array–Pumped Nd:YAG Laser with Side–Pumped Rod Geometry," *Journal of Quantum Electronics*, vol. 28, No. 4, Apr. 1992, pp. 977–985.

Patent Abstracts of Japan: Publication No. 05259540, Aug. 10, 1993, Application No. 04051316, Oct. 3, 1992.

H. Ajer, et al., "Efficient Diode–Laser Side–Pumped $TEM_{00}$–Mode Nd:YAG Laser," *Optics Letter*, vol. 17, No. 24, Dec. 15, 1992, pp. 1785–1787.

D. W. Hughes, et al., "Laser Diode Pumped Solid State Lasers," *J. Phys. D.: Appl. Phys.*, vol. 25, 1992, pp. 563–586.

W. Koechner: "Solid–State Engineering," Springer Verlag Berlin Heidelberg, 1992, pp. 246–249.

Welford, et al., "Observation of Enhanced Therman Lensing Due to Near–Gaussian Pump Energy Deposition in a Laser–Diode Side–Pumped Nd:YAG Laser," *Journal of Quantum Electtronics*, vol. 28, No. 4, Apr. 1992, pp. 1075–1080.

Choi, et al., "A Q–switched Alexandrite Laser Injection Seeded by a Rubidium Absorption Frequency Matched Diode Laser," *Optics Communications*, vol. 88, No. 4.4.5, Apr. 1, 1992, pp. 385–390.

Fix, et al., "Tunable β–barium Borate Optical Parametric Oscillator: Operating Characteristics with and without Injection Seeding," *J. Opt. Soc. Am B.*, vol. 10, No. 9, Sep. 1993, pp. 1744–1750.

Rosenberg, et al., "Broadly Tunable, Single–Frequency Optical Parametric Frequency–Conversion System," *J. Opt. Soc. AM B.*, vol. 10, No. 9, Sep. 1993, pp. 1716–1722.

A.W. Yu, et al., "1047 nm Laser Diode Master Oscillator Nd: YLF Power Amplifier Laser System," *Electronics Letters*, Apr. 1993, vol. 29, No. 8, pp. 678–679.

Company Literature of the Lightwave Electronics Corp., Technical Information: "Introduction to Diode–Pumped Solid–State Lasers," 1993, pp. 1–16.

Advertising brochure: "SCANmate." Produced by Lambda Physik, printed Apr. 1994, pp. 1–15.

J. E. Bernard, et al., "High–Repetition–Rate–Didode–Pumped Nd: YV04 Slab Laser," *Opt. Lett.*, Nov. 15, 1994, vol. 19, No. 22, pp. 1861–1863.

S. A. Payne, et al., "Laser, Optical, and Thermomechanical Properties of Yb–doped Fluorapatite," *IEEE Journal of Quantum Electronics*, vol. 30, No. 1, Jan. 1994, pp. 170–179.

C.E. Hamilton, et al., "1–W Average Power Levels and Tunability From a Diode–Pumped 2.94 $\mu$m Er: YAG Oscillator," *Opt. Lett.*, Oct. 15, 1994, vol. 19, No. 20, pp. 1627–1629.

Walker, et al., "Efficient Continuous–Wave $TEM_{00}$ Operation of a Transversely Diode–Pumped Nd:YAG Laser," *Optics Letters*, vol. 19, No. 14, Jul. 15, 1994, pp. 1055–1057.

Selker, et al., "Efficient, Diode–Laser–Pumped, Diode–Laser–Seeded, High–Peak–Power Nd: YLF Regenerative Amplifier," *Optics Letters*, Apr. 15, 1994, vol. 19/8, No. 08, pp. 551–553.

B. Comaskey, et al., "24–W Average Power at 0.537 $\mu$m from an Externally Frequency–Doubled Q–Switched Diode–Pumped Nd:YOS Laser Oscillator," *Applied Optics*, vol. 33, No. 27, Sep. 20, 1994, pp. 6377–6382.

Knappe, et al., "Single–Mode Continuous–Wave Cr3t:LISAF Ring Laser Pumped by an Injection–Locked 670–nm Broad–Area Diode Laser," *Opt. Lett.*, 20m, Oct. 1995, pp. 1988–1990.

Golla, et al., "300–W cw Diode–Laser Side–Pumped Nd:YAG Rod Laser," *Optics Letters*, vol. 20, No. 10, May 15, 1995, pp. 1148–1150.

R. S. Afzal, et al., "Simple High–Efficiency $TEM_{00}$ Diode–Laser–Pumped Q–Switched Laser," *Optics Letters*, vol. 20, No. 5, Mar. 1, 1995, pp. 465–467.

P. Peuser, et al., "Diodengepumpte Feskörperlaser," Springer–Verlag Berlin Heidelberg, 1995, book cover and copyright pages, pp. 234–237, and pp. 313–314, (in German).

L. A. Rahn, "Feedback Stabilization of an Injection–Seeded Nd: YAG Laser," *Appl. Opt.*, 24, 990, Apr. 1985, pp. 940–942.

M. J. Johnson, et al., "Continuously Tunable Narrow–Band Operation of an Injection–Seeded Ring–Cavity Optical Parametric Oscillator: Spectroscopic Applications," *Optics Letters*, vol. 20, No. 11, Jun. 1, 1995, pp. 1277–1279.

J.M. Boon–Engering, et al., "Bandwidth Studies of an Injection–seeded β–barium Borate Optical Parametric Oscillator," *Optics Letters*, vol. 20, No. 4, Feb. 15, 1995, pp. 380–382.

T. D. Raymond, et al., "Two–Frequency Injection–Seeded Nd: YAG Laser," *IEEE Journal of Quantum Electronics*, Oct. 1995, vol. 31, No. 10, pp. 1734–1737.

V. Petrov, et al., "Frequency Upconversion of Tunable Femtosecond Pulses by Parametric Amplification and Sum-frequency Generation in a Single Nonlinear Crystal," *Optics Letters*, vol. 20, No. 21, Nov. 1, 1995, pp. 2171–2173.

W. Koechner, *Solid–State Laser Engineering*, $3^{rd}$ Completely Revised and Updated Edition, pp. 127–140, 709, (Springer series in Optical Sciences, v.1, Springer–Verlag, Berlin, Heidelberg, New York, 1996.

L. D. DeLoach, et al., "Transition Metal–Doped Zinc Chalcogenides: Spectroscopy and Laser Demonstration of a New Class of Gain Media," *IEEE Journal of Quantum Electronics*, Jun. 1996, vol. 32, No. 6, pp. 885–895.

N. J. Vasa, et al., "Comparative Study of Spectral Narrowing of a Pulsed Ti:Sapphire Laser Using Pulsed and CW Injection Seeding," *Applied Physics B*, vol. 62, 1996, pp. 51–57.

Goldberg, et al., V–Groove Side–Pumped 1.5$\mu$m Fibrre Amplifier, *Electronics Letters*, vol. 33, No. 25, Dec. 4, 1997, pp. 2127–2129.

Fujikawa, et al., "Hig–Pwer High–Efficient Diode–Pumped Nd: YAG Laser," *Advanced Solid State Lasers, Optical Society of America*, Topical Meeting, Orlando Florida, Jan. 27–29, 1997, pp. 296–299.

A. Taguchi, et al., "Effects of Moisture on CLBO," *OSA Topics: Advanced Solid State Lasers*, vol. 10, 1997, pp. 19–23.

Fuller, M., et al., "High–gain end–pumped lasers," *Cleo '98*, 1998, pp. 431–432, paper CThP1.

Golla, et al., "Design and Operation of a 250 W cw, Diode–Laser Side–Pumped Nd:YAG Rod Laser," 3 pages. (No Date).

Spec. Sheet: "CEO: High Performance Diode–Pumped Lasers" Published by Cutting Edge Optronics, Inc.; St. Charles, MO, U.S.A. Faxed stamped Aug. 17, 1999, 8 pages total.

Spec. Sheet: "CEO: High Performance Diode–Pumped Lasers: 100W CW Diode–Pumped Nd:YAG Rod Laser Systems" Published by Cutting Edge Optronics, Inc.; St. Charles, MO, U.S.A. 2 pages.

Spec. Sheet: DLS Diodengepumpter Nd: YAG–Laser, 30 Watt, published by LASAG AG, Switzerland, 2 pages. (No Date).

Honea, E.C., et al., "183–W, $M^2$=2.4 Yb:YAG Q–Switched Laser," *Optics Letters*, vol. 24, No. 3, Feb. 1, 1999, pp. 154–156.

* cited by examiner

LASER FREQUENCY CONVERTER WITH AUTOMATIC PHASE MATCHING ADJUSTMENT

PRIORITY

This application claims the benefit of priority to U.S. provisional patent application No. 60/184,888, filed Feb. 25, 2000.

BACKGROUND OF THE INVENTION

1. Field of the Invention

The invention relates to a nonlinear frequency converter apparatus particularly for diode-pumped solid state lasers, and more particularly to an automatic phase matching adjustment method and apparatus for incident and converted wavelength components.

2. Discussion of the Related Art

Diode pumped solid state lasers are efficient, compact and reliable sources of high beam quality optical radiation. The group of solid state lasers includes most commonly the neodymium laser, and also ruby lasers, but there are many others. Triply ionized neodymium is the active material of neodymium lasers. In a crystal, the neodymium is a substitutional dopant (most commonly for yttrium). Neodymium may also be incorporated into a glassy matrix. Neodymium may further form part of a crystal, such as with neodymium pentaphosphate NdP5O14. The most common host for neodymium is yttrium aluminum garnet (YAG), or Y3AI5O12. Other common neodymium hosts include yttrium lithium fluoride (YLF), or YLiF4; gadolinium scandium gallium garnet (GSGG), or Gd3Sc2Ga3O12; yttrium aluminate (YALO or YAP), or YALO3; and yttrium vanadate (YVO), or YVO4. Neodymium may also be hosted by phosphate and silicate glasses. Some more recently discovered neodymium host materials holding promise in the solid state laser field include gadolinium vanadate (GdVO), or GdVO4; and yttrium vanadate (YVO), or YVO4. Ytterbium (Yb) is also being doped into such crystals as YAG, YLF and YVO. Gadolinium vanadate crystals may also be doped with thulium (Tm) or thulium-holmium (Tm,Ho), rather than with neodymium. Titanium doped sapphire (Ti:Al2O3) and erbium doped YAG (Er:YAG) are also coming into vogue in the solid state laser field.

The principal wavelengths of lasing action for most solid state lasers is in the infrared (IR) spectral range. However, it is desirable to convert solid state lasers to lase in the ultraviolet (UV) spectral range. This frequency conversion is achieved with high efficiency by means of nonlinear optical conversion using nonlinear optical crystals. These crystals are normally arranged in the laser setup within the laser resonator for CW systems and outside the laser resonator for pulsed systems.

Commonly employed nonlinear conversion processes are harmonic generation, such as second, third and fourth harmonic generation (SHG, THG and FHG, respectively), and sum frequency generation (SFG). Other techniques include Raman shifting, sum and difference frequency mixing and parametric conversion. Harmonic generators may be packaged with the laser. Other techniques such as the above-mentioned ones are normally done using separate accessories. Many nonlinear optical crystals are available for doubling of the light frequency of solid state lasers thus converting the light into the visible range. However, efficient quadrupling and quintupling of laser radiation present significant challenges due to a very limited selection of non-linear crystals and a necessity for special operating conditions for efficient and long-lasting operation.

Very few nonlinear crystals are available for nonlinear conversions of solid state laser light below 300 nanometers (nm) due to their transparency, non-linear coefficients and adequate birefringence. Of these, beta barium borate (BBO), or _—BaB2O4, lithium borate (LBO), or LiB3O5, and Cesium Lithium Borate (CLBO), or CsLiB6O10, each allow efficient conversion to the shortest wavelengths.

Laser systems using frequency conversion are being used in increasingly demanding industrial, medical and scientific applications. For example, it is desired for micro-machining of various materials in electronics and medical device manufacturing to have a laser with a short output wavelength and that has high stability and may be operated over a long term in a hands-off capacity. Minimizing the number and/or duration between scheduled maintenance of the laser system advantageously results in a reduction of running cost and an increase of production throughput. Conventional laser frequency converters require periodic re-adjustment of the phase-matching angle of the crystal during which time production is interrupted. For maximizing conversion efficiency, it is desired that a phase matching condition be continuously fulfilled, wherein the phase velocities for both an incident and a converted wavelength are made equal.

A common method utilizes a natural birefringency of the nonlinear optical crystal. When this method is applied, for example, to second harmonic generation, one of the waves is ordinary and the other is extraordinary. The direction of propagation of the two waves in the crystal is chosen so that refractive indices for the two waves are equal to each other (see e.g. J. E. Midwinter, J. Warner, Brit. J. Applied Physics, v. 16, p. 1135 (1965); and G. C. Bhar, D. C. Hanna, B. Luther-Davies, R. C. Smith, Optics Communications, v.6, p.323 (1972), each of which is hereby incorporated by reference).

This direction is characterized by a certain angle, called the "phase-matching" angle, between the direction of propagation of the waves and an optical axis of the crystal. It is desired to have an accuracy of maintaining the phase-matching angle that is substantially better than 1 mrad, such as 0.1 mrad. Additionally, since the ordinary and extraordinary refractive indexes are temperature dependent, the phase-matching angle is a function of crystal temperature. Therefore, it is desired to maintain the crystal at a constant temperature, in addition to maintaining the direction of the two waves at the phase-matching angle. Likewise, the phase matching condition can be attained by either varying the angle at constant temperature, or varying the crystal temperature at a fixed beam propagation angle with respect to the crystallographic axes.

Therefore, it is desired to have a frequency converter undergo periodic re-alignment of the angle of the non-linear optical crystal angle and/or the temperature of the crystal, in order to maintain an optimal conversion efficiency. It is recognized herein that a possible way of reducing the frequency of realignments is to provide a mechanically highly stable beam direction with respect to the optical axis of the crystal, and to stabilize the temperature of the crystal in absolute terms, e.g., by means of high-accuracy temperature controller. This approach may be difficult to implement in practice, particularly since the local temperature inside the crystal may be different from the temperature of the crystal holder, which would typically be what is stabilized by the temperature controller. The reason for this difference is most commonly local heating due to absorption of the laser beam at defect and impurity sites within the crystal. Since the amount of heat depends on the laser power and the condition of the crystal, such local temperature variations lead to instability and a hysteresis of the output power of the converter.

Therefore, it is desired to have means for adjusting the phase-matching in the crystal based on parameters of the converted beam, in a closed-loop arrangement, rather than relying on the stability of environmental parameters. We can propose several approaches. For example, the power of the converted beam can be optimized by means of some algorithm that scans a range of temperatures/angles to determine an optimum position, The main problem here is that based on a single measurement of the output power alone, the direction of adjustment of the phase-matching angle or temperature in order to restore perfect alignment is not determined. The algorithm might includes varying the beam angle (or crystal temperature) and simultaneously monitoring changes in the output power, for determining the optimum angle (or temperature). A disadvantage of this algorithm is that it leads to variations of the power of converted beam, thus rendering on-line adjustment using this technique undesirable.

U.S. Pat. No. 3,962,576, which is hereby incorporated by reference, discloses an automatic phase matching apparatus and method which is illustrated at FIG. 1. As shown in FIG. 1, the crystal is mounted in a cell that is rotatable. A portion of an incident beam passing through the crystal is reflected by a quartz plate. The reflected light is received at a pair of photoelectric detectors connected to an operational amplifier. The photoelectric detectors are disposed side-by-side in the beam path of the reflected beam. When the output of the two detectors is not equal, the op amp signals a driving unit to rotate the crystal.

The position-sensitive detector in the '576 patent measures a shift of a center of a converted beam as the wavelength of the incident beam changes. Such shift occurs because of wavelength dispersion of the refractive indexes of the nonlinear crystal. Thus, different wavelengths have different phase-matching angles at a given temperature. Disadvantages of the system shown at FIG. 1 include: (1) changes in the direction of the incident beam lead to misalignment of the entire apparatus, since the converted beam at optimal phase-matching condition is no longer centered on the detector; and (2) rotation of the nonlinear crystal leads to a parallel shift of the transmitted beam which causes misalignment of the incident beam, thus causing the same problem as in (1). A possible solution for this second problem could be immersing the crystal into optically transparent and index-matched fluid. However, such fluid may not be available or desirable for every crystal or wavelength.

RECOGNIZED IN THE INVENTION

It is recognized herein that it is wrong to assume that the fundamental harmonic component remains fixed at the optimum angle, so that adjusting the crystal axis orientation to move the total output beam to center is assumed to move the secondary harmonic to center. This may not be the case, since if the fundamental harmonic is off center and the secondary harmonic is off center in the opposite direction, then the total beam may be centered, or appear to have an optimized orientation relative to input beam direction, while the secondary harmonic is off center.

FIGS. 2a–2b illustrate what is recognized herein as a problem with the above method and apparatus, e.g., as set forth in the '576 patent and shown herein at FIG. 1. At FIG. 2a, a perfect phase matching condition is met, wherein an unconverted portion of the incident beam and the converted beam are each aligned along the phase matching direction, wherein the respective centers of their intensity distributions, $x_1$ and $x_2$, are determined to be individually aligned to produce an overall intensity maximum centered at $x_1 = x_2$.

At FIG. 2b, a de-tuned phase matching condition is illustrated, wherein the two beams are not aligned along the phase matching direction, and instead are misaligned in opposite directions. In the case of FIG. 2b, the intensities detected at the detectors of the apparatus of the '576 patent shown at FIG. 1 would indicate that the phase-matching condition was met, since the intensities at the two detectors would be equal, while actually the unconverted and converted components are equally and oppositely misaligned from the phase matching direction in terms of intensity. This results in an overall loss of efficiency.

An additional problem with the '576 patent is that even in the case wherein a spectrally selective detector is used, misalignment of the fundamental beam with respect to the detector is a problem. The reason is that the apparatus would center the converted beam on the detector, which is a problem because the optimum alignment occurs when the converted beam is centered with respect to the fundamental beam. The spectrally selective detector would only detect the converted beam.

SUMMARY OF THE INVENTION

It is therefore an object of the invention to provide an automatic phase-matching apparatus and method, wherein fundamental and frequency converted components of a laser beam are phase-matched and aligned together along a phase-matching angle of a nonlinear optical frequency conversion crystal.

In accord with this object, a laser system and method are provided, wherein a laser system includes a laser source and at least one orientationally adjustable and/or temperature-controlled nonlinear optical crystals. First and second position sensitive detectors respectively detect fundamental and higher frequency harmonic beams. A controller receives signals from the first and second detectors indicative of a phase matching error and controls an orientation and/or a temperature of the crystal based on the signals to substantially a phase matching condition.

A method includes generating an original beam at a fundamental frequency, converting the original beam by passing through at least one nonlinear optical crystal to a converted beam including a higher frequency component, detecting a fundamental beam and a higher frequency harmonic beam, and controlling an orientation and/or a temperature of the nonlinear optical crystal based on the detecting of the fundamental beam and the higher frequency harmonic beam to substantially a phase-matching condition.

INCORPORATION BY REFERENCE

Figure 1:
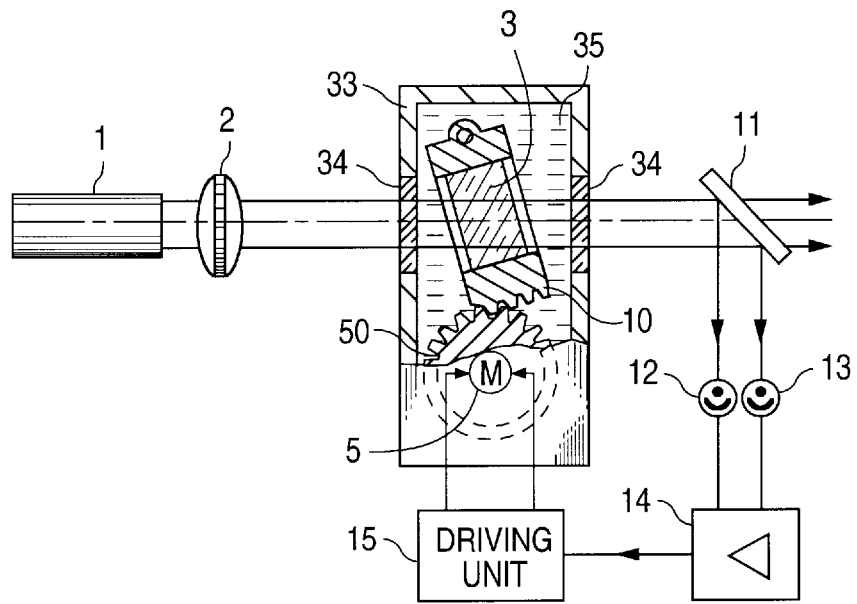
FIG. 1 shows a phase matching apparatus of the prior art.

References cited above and below herein, including that which is described as background and recognized in the invention, and the above invention summary, are hereby incorporated by reference into the detailed description of the preferred embodiment below, as disclosing alternative embodiments of elements or features of the preferred embodiments not otherwise set forth in detail below. A single one or a combination of two or more of these references may be consulted to obtain a variation of the preferred embodiments described in the detailed description below. Further patent, patent application and non-patent references are cited in the written description and are also incorporated by reference into the detailed description of the preferred embodiment with the same effect as just described with respect to the following references:

Taguchi, A., Miyamoto, A., Mori, Y., Haramura, S., Inoue, T., Nishijima, K., Kagebayashi, Y., Sakai, H., Yap, Y. K., and Sasaki, T., Effects of Moisture on CLBO, OSA Topics, in Advanced Solid State Lasers, C. R. Pollock and W. R. Bosenberg, eds., OSA, Vol. 10 (1997); and U.S. Pat. No. 6,002,697, 3,858,056, 5,093,832, 5,365,366, 5,638,388, 5,847,861, 5,854,802, and 5,898,718.

DETAILED DESCRIPTION OF THE PREFERRED EMBODIMENTS

The preferred embodiments provide an apparatus and method for automatically maintaining a phase-matching condition for a nonlinear frequency converter of a laser, particularly, a diode-pumped solid-state laser. This allows stable, maintenance-free long-term operation of the converter. The preferred embodiments also provide an apparatus and method for automatic, on-line adjustment of the phase-matching condition, without affecting the output of the laser and thus, eliminating undesirable downtime for periodic maintenance.

In the preferred embodiment, two alternative approaches are generally described. The first one utilizes the fact that the shape of the converted beam intensity distribution depends on whether the beam propagation angle coincides with the phase-matching angle. This shape allows a determination of the sign of the deviation, as will be explained below. By knowing the direction of the deviation, one can adjust the angle or the temperature (or both) before the output power has changed noticeably. The second approach uses a small modulation of the crystal temperature or angle in order to establish a correlation between signs of changes in the temperature and output power. The sign of correlation is directly related to the sign of the crystal orientation or temperature correction operation.

The preferred embodiment includes an apparatus including a first position sensitive detector, or psd, for monitoring the secondary harmonic and a second psd for monitoring the fundamental harmonic. The light impinging each of the first and second psd's is first spectrally filtered so that each psd only measures the corresponding component of the beam that each is intended to measure. The crystal orientation or temperature is then adjusted in the proper direction to optimize the intensity of the secondary harmonic component.

Figure 2A:
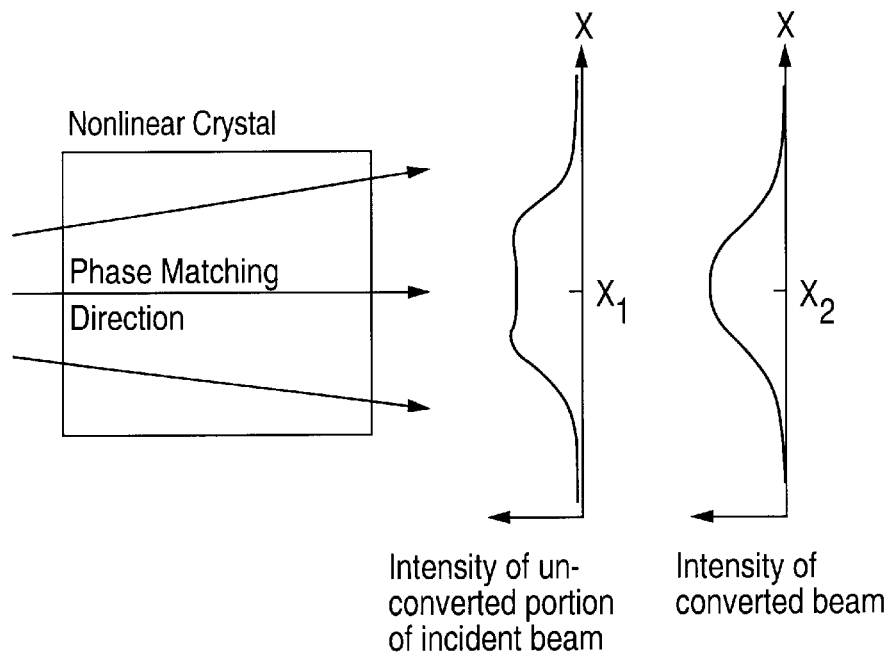
FIGS. 2a–2b illustrate beam intensity distributions for incident and frequency converted beams for perfect phase matching and for de-tuned phase matching, respectively, as recognized herein.
Figure 2B:
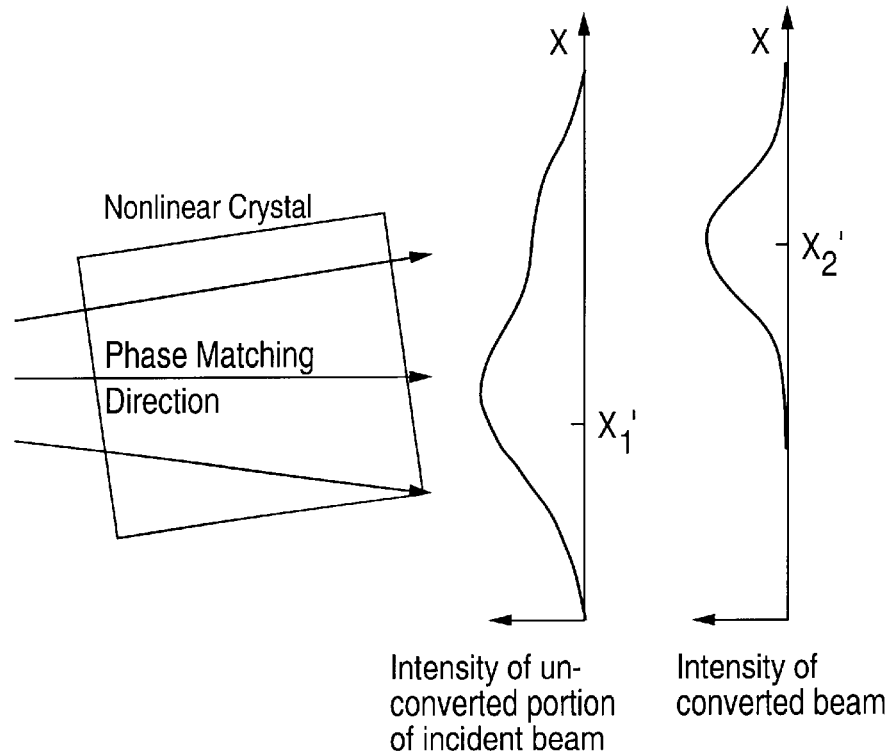

FIGS. 3–6 schematically show preferred embodiments. According to these embodiments, both the frequency converted beam and the residual incident beam are monitored. Referring again to FIGS. 2a–2b for illustration, changes in the beam intensity distribution depend on whether the phase-matching condition is satisfied. In FIGS. 2a–2b, x is a coordinate of the "center gravity" of the beam intensity distribution in the plane containing the phase-matching angle. In the perfect phase-matching case of FIG. 2a, both the incident beam at fundamental frequency and the converted beam are centered with respect to the phase-matching direction in the nonlinear crystal. The residual beam at fundamental frequency is depleted in the phase-matched direction, and its center of gravity $x_1$ coincides with that of the converted beam $x_2$: $x_1 = x_2$.

If the phase-matching condition is violated (due to either mechanical misalignment of the crystal or a temperature change), the intensity distributions may become skewed in opposite directions. The converted beam's center of gravity $x_2'$ approximately follows the phase-matching direction, whereas the center of gravity of the fundamental beam $x_1'$ shifts in the direction opposite to the incident beam's center, due to a partial depletion on the side of the phase-matching direction. Thus, the magnitude and sign of the difference $X_2' - X_1'$ serves as an indicator of the magnitude and sign of the deviation from the perfect phase-matching condition. Therefore, this difference can be used as an error signal in a closed-loop control algorithm.

In view of the above description, having two detectors, instead of only one as described, e.g., in the '576 patent, has an advantage that the error signal represented by $X_2' - X_1'$ is not dependent on the incoming beam direction, but rather on its relative direction with respect to the phase-matching direction. Secondly, depletion of the intensity profile of the residual fundamental beam increases the error signal by an amount equal to $X_1' - X_1$. This improves resolution and sensitivity of the method.

Figure 3:
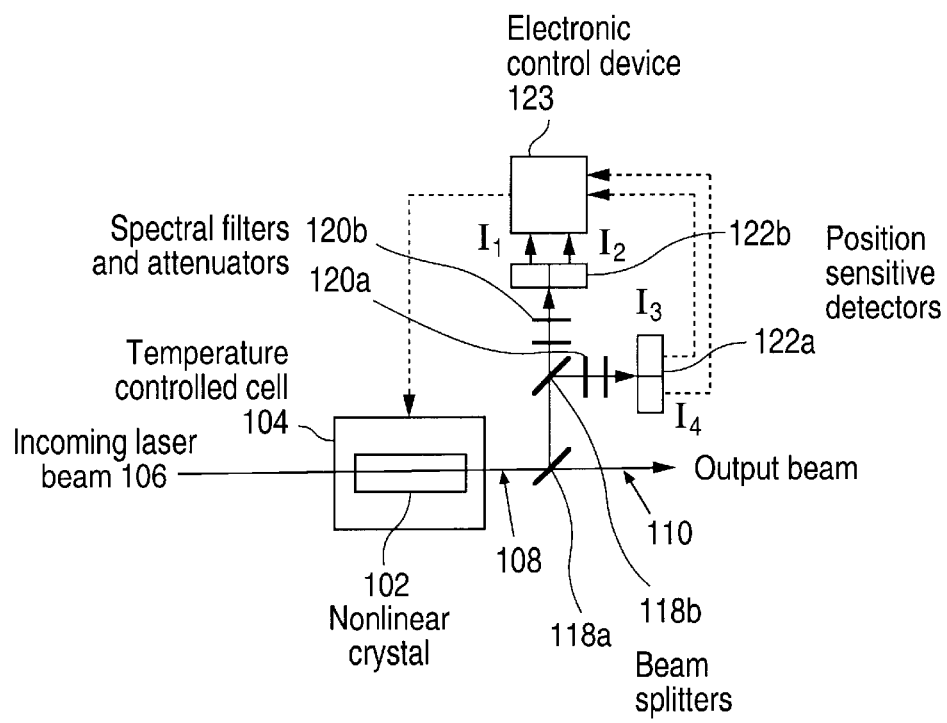
FIG. 3 shows an apparatus for automatic phase matching according to a first embodiment.
Figure 4:
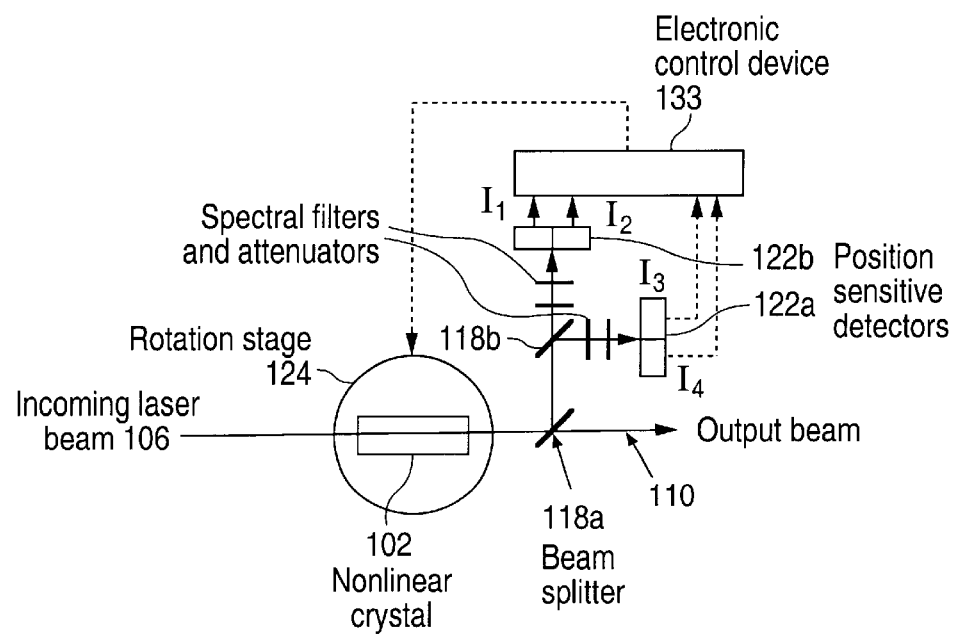
FIG. 4 shows an apparatus for automatic phase matching according to a first embodiment.

Based on the above, then, several embodiments can be constructed and four exemplary embodiments are presented below with reference to FIGS. 3–6. FIG. 3 schematically shows a nonlinear crystal 102 within a temperature controlled cell 104. Such cell 104 may be as described at U.S. Pat. No. 6,002,697, and particularly at FIG. 2 therein and reproduced at FIG. 8 herein, see below, which patent is hereby incorporated by reference, including a Brewster window, a heater on or near a crystal holder, leads to a temperature controller, means for rotating/adjusting the crystal orientation such as by rotating the cell 104 or the crystal within the cell, means for pumping out the cell and/or purging the cell with an inert gas, etc. The embodiment of FIG. 3 is, however, particularly drawn to a temperature controlled cell 104, while FIG. 4 is particularly drawn to a cell on a rotation stage (see below). A preferred cell 104 has both rotation/orientation and temperature adjustability, and the cell 104 may have one of temperature and rotational adjustability, and may be translationally adjustable, as well.

With respect to rotational or orientational adjustability of the crystal, such orientational adjustability is preferably achieved by coupling the crystal with a holding mechanism, which is preferably mechanical and may be electromagnetic, wherein the holding mechanism is rotatable which in turn rotates the crystal with respect to the incoming beam 106. The mechanism for adjusting the orientation of the crystal is preferably that shown and described in the '697 patent, e.g., at FIG. 5 therein and reproduced at FIG. 9 herein, see below, and may be otherwise and understood by those skilled in the art.

An incoming laser beam 106 is shown incident on the crystal within the cell. The outgoing beam 108 then includes a fundamental component and a frequency converted component, such as a secondary harmonic component. The preferred embodiments described herein are also applicable to third, fourth and fifth harmonic generating crystals, and generally to any nonlinear optical frequency conversion crystal arrangement. A portion of the beam 108 is reflected at the beam splitter 118a, while an output beam 110 for use in an industrial, medical or scientific application transmits the beam splitter 118a. The main beam may be alternatively reflected while the diagnostic beam is transmitted at the beam splitter 118a.

The beam portion reflected at the first beam splitter 118a, as shown in FIG. 3, is incident on a second beam splitter 118b. A component transmits the beam splitter 118b and a component reflects from the beam splitter 118b. As shown, the reflected component encounters a spectral filter/attenuator arrangement 120a before being incident at a position sensitive detector (psd) 122a. The transmitted component encounters a spectral filter/attenuator arrangement 120b before being incident at psd 122b. One of the spectral filters of the arrangements 120a and 120b filters out the fundamental component and the other filters out the secondary or converted component. Thus, respectively, one of the psds 122a and 122b detects the secondary harmonic component and the other detects the fundamental component of the portion of the beam 108 reflected at beam splitter 118a.

The psds 122a and 122b each include at least two photodiode segments. An electronic control device 123 receives signals from both psds 122a and 122b. Depending on the signal received, the temperature of the cell 104 is adjusted to adjust the signal, e.g., to that shown at FIG. 2a, or so that the phase-matching condition is again met.

The second embodiment shown at FIG. 4 is preferably the same as that shown at FIG. 3, except that the phase-matching condition is controlled by rotation of the crystal 102 with respect to the beam 106 by using a rotation stage 124. In addition, the electronic control board 133 is configured to control the rotation of the stage 124, as opposed to the electronic control device 123, which is configured to control the temperature within the cell 104 of the first embodiment of FIG. 3.

Figure 5:
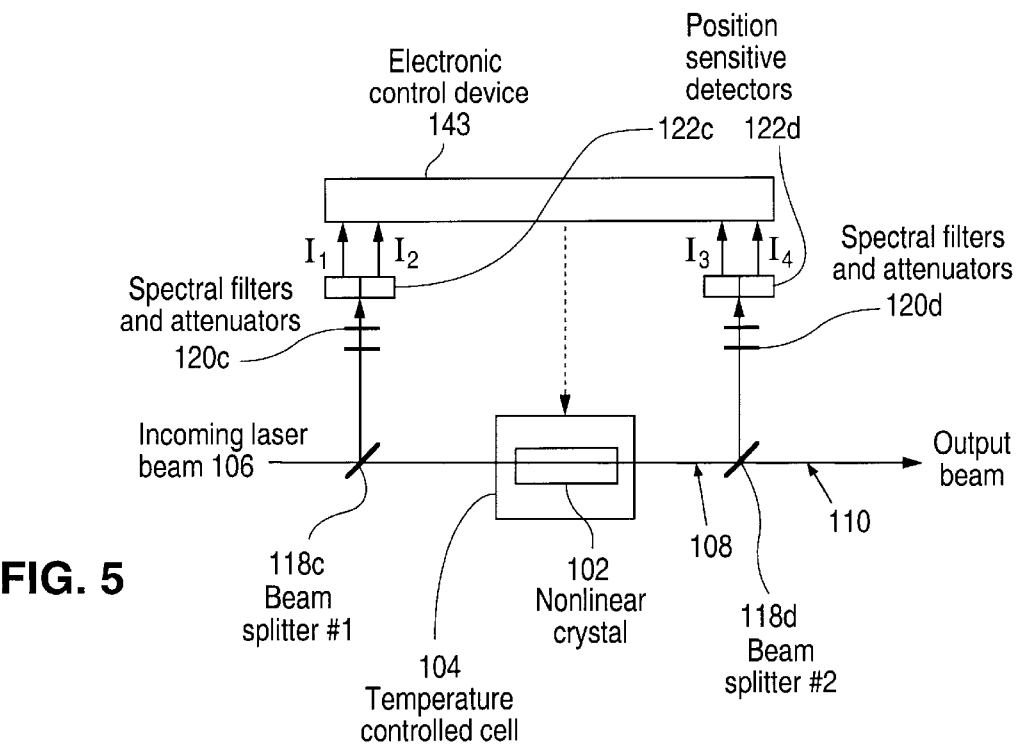
FIG. 5 shows an apparatus for automatic phase matching according to a first embodiment.

In the third embodiment shown in FIG. 5, a portion of the incoming beam is reflected at beam splitter 118c prior to impinging upon the nonlinear crystal 102. The nonlinear crystal is shown in a temperature controlled cell 104, but may be on a rotation stage (see FIG. 4) or may be both in a temperature controlled cell 104 and on a rotation stage, and may be otherwise configured for pumping and/or purging, etc., as described in the '697 patent, mentioned above.

The portion of the incoming beam 106 that transmits the beam splitter 118c passes through the crystal 102. The outgoing beam 108 from the crystal 102 then has secondary and fundamental frequency components, and a portion of this beam 108 is reflected at beam splitter 118d, as shown. The beam portion reflected at beam splitter 118c passes through spectral filter/attenuator arrangement 120c, such that only the fundamental component is incident at psd 122c. The spectral filter of the arrangement 122c may alternatively be left out, since the beam 106 will mostly comprise the fundamental component. The beam portion 108 that transmits the crystal 102 and is reflected at beam splitter 118d passes through spectral filter/attenuator arrangement 120d. The spectral filter of the arrangement 120d filters out the fundamental component, and the filtered beam then impinges upon psd 122d.

The psds 122c and 122d each include at least two photodiode segments. An electronic control device 143 receives signals from both psds 122c and 122d. Depending on the signal received, the temperature of the cell 104 is adjusted to adjust the signal, e.g., to that shown at FIG. 2a, or so that the phase-matching condition is again met. Alternatively, the crystal 102 is rotated.

The first through third embodiments of FIGS. 3–5, respectively, utilize position sensitive detectors (psds) in order to measure coordinates $x_1$ and $x_2$ of the center of gravity of the beam intensity distribution. One commonly used type of position sensitive detector is a detector in which a sensitive area is split into two identically sensitive areas. These two areas are separated by a narrow insulating gap. In a first approximation, a coordinate of the beam center is proportional to the difference of signals $l_1$ and $l_2$ from two light sensitive elements of the detector (i.e., 122a, 122b, 122c or 122d):

$$x_1 \sim (l_1-l_2)/(l_1+l_2), \text{ and } x_2 \sim (l_4-l_3)/(l_4+l_3). \tag{1}$$

Beam splitter 118a of the first and second embodiments of FIGS. 3–4 placed in the beam path following the nonlinear crystal 102, splits off small portions of the converted and remaining fundamental beams. The second beam splitter 118b has a dichroic coating so that the converted beam is reflected and the residual fundamental beam is transmitted (or vice versa). Additional spectral filters of arrangements 120a–120d help to minimize the amount of residual beams of the "wrong" wavelength. Attenuators of the arrangements 120a–120d ensure that the signals are within the dynamic range of detectors 122a–122d, respectively.

The closed loop control algorithm of the firt through third embodiments takes the value $(x_1-x_2-x_{offset})$ as an input error signal. Here, $x_{offset}$ is a preset offset value at which a conversion efficiency is optimized. By translating detectors 122a–122d or tilting beam splitters 118a–118d, this value can be made equal to zero, however, it is generally not necessary. Also, it is preferred to make both $x_1$ and $x_2$ equal to zero initially, since this minimizes errors due to deviation from linearity in formulas (1). The third embodiment differs from the first and second embodiments in that the coordinate of the fundamental beam 106 is measured before the nonlinear crystal 102. This is advantageous in situations when beam profile is not perfectly Gaussian, and is instead multimode and of complex shape. A disadvantage, however, is that there is no additional contribution to the error signal due to depletion of the fundamental beam, as discussed above. Another disadvantage is that the crystal may be advantageously temperature controlled, as shown, but rotation adjustment is not preferred to adjust phase-matching since this will introduce additional parallel shift of the converted beam. Therefore, phase matching in the third embodiment should be preferably adjusted by temperature change. As opposed to the third embodiment, rotation of the crystal 102 in the second embodiment will cause simultaneous shifts of both fundamental and converted beams, which will cancel each other in the algorithm.

As mentioned, similar concepts can be extended to multi-stage frequency converters (see, e.g., the '697 patent). For example, a fourth harmonic generator may include two stages: a second harmonic generator, and another frequency doubling stage to convert the second harmonic into a fourth harmonic. In a third harmonic converter, a frequency doubling crystal is followed by a frequency mixing stage which adds the fundamental frequency to the second harmonic frequency. Each stage can be controlled by arrangements similar to those of the first to third embodiments of FIGS. 3–5.

Figure 6:
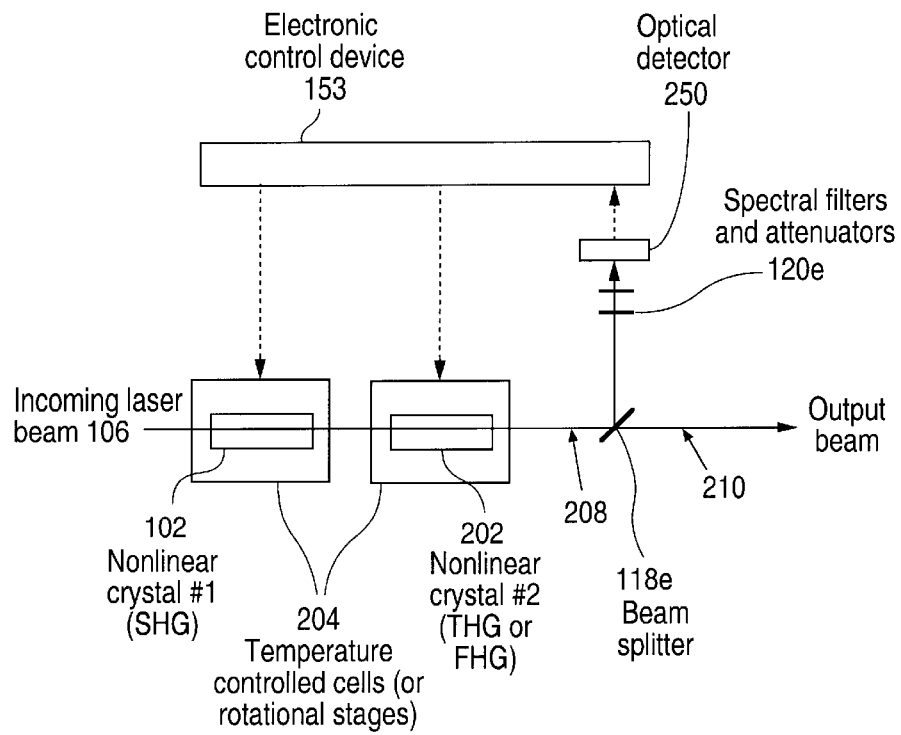
FIG. 6 shows an apparatus for automatic phase matching according to a first embodiment.

In the fourth embodiment shown at FIG. 6, the incoming beam 106 passes through a first nonlinear crystal 102 which generates a secondary harmonic component. The beam then passes through a second nonlinear crystal 202 which generates a third or fourth harmonic component. The beam 208 after the two crystals then has a fundamental, a second harmonic and either a third or fourth harmonic components. The beam 208 then has a portion reflected at beam splitter 118e and a transmitted portion which is the output beam 210.

The reflected portion of the beam 208 passes through a spectral filter/attenuator arrangement 120e before impinging upon an optical detector 250. The detector 250 sends a signal to a control board 153 which may adjust the temperature or orientation of the crystals 202, 204 depending on the signal received from the optical detector 250, i.e., depending on whether the cells 202, 204 are phase-matched.

The fourth embodiment utilizes a different concept of automatic adjustment in a single or multi-stage converter. It is particularly advantageous when the beam profile of beam 106 has a complex shape, or when splitting off the portion of the beam between conversion crystals 202 and 204 may not be feasible. In this fourth embodiment, the power of the converted beam is detected at the detector 250, rather than its direction, as in the first to third embodiments, described above. The task of the algorithm is to maximize the output power without significantly disturbing the output. The algorithm is based on periodic modulation of the crystal temperature (or angle) by a small amount, so that the output power changes only within limits acceptable to the application. However, these small changes of the output are detected, and depending on the sign of the change, the controller 153 adjusts the temperature (or angle) of the crystals 202, 204 in a direction towards maximum power.

Figure 7:
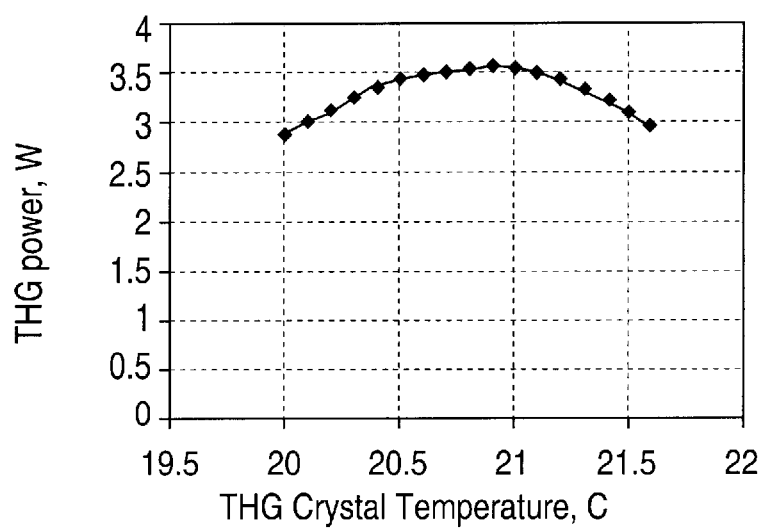
FIG. 7 shows a graph of a dependence of output third harmonic generation power versus temperature.

For example, FIG. 7 shows an experimental dependence of the output power of a third harmonic converter of a diode-pumped Nd:YAG laser. As can be seen in FIG. 7, the temperature may be maintained within about +/−0.25° C. to maintain the output power within about +/−1.5%. In many applications, this level of output stability is sufficient. At the same time, by periodically modulating the crystal temperature at a smaller amplitude, say by 0.1° C., one may cause a still detectable change for the controller 153 to adjust the output. If, for example, phase matching conditions change such that the crystal temperature falls below an optimal point, then increase of the temperature leads to increase of the output power, and vice versa. Therefore, a positive correlation between temperature and power variations indicates that the actual temperature is below an optimum point. Likewise, a negative or anti-correlation indicates that the temperature is above the optimum.

In order to increase the resolution of the method and, therefore, reduce the impact of the modulation on the application, one may apply numerous statistical methods with respect to the fourth embodiment. For instance, averaging the signal over a period of time and calculating a correlation over many modulation periods may reduce the uncertainty. Furthermore, if only the sign of the correlation is detected, the influence of noise is minimal. This is an equivalent to an "on-off" control loop. Regulation may not be as fast as in a proportional control algorithm. In a proportional control algorithm, the increments by which the controller 153 adjusts the temperature, are proportional to the magnitude of the correlation, i.e., the error signal. In each particular instance, one or another algorithm can be preferred, depending on the signal-to-noise ratio of the system and an allowable modulation of the output power.

In a multi-stage converter, temperatures or angles of crystals can be adjusted sequentially, in multiple iterations. An alternative approach would be to modulate the temperature or angles of crystals at two distinctively different frequencies. Then, a correlation component at each frequency is calculated by averaging over multiple cycles. As the number of cycles used in the averaging period increases, a contribution of the other frequency to each component is diminished. An advantage of this method is that it allows simultaneous tuning of both crystals. However, it requires longer averaging times.

Figure 8:
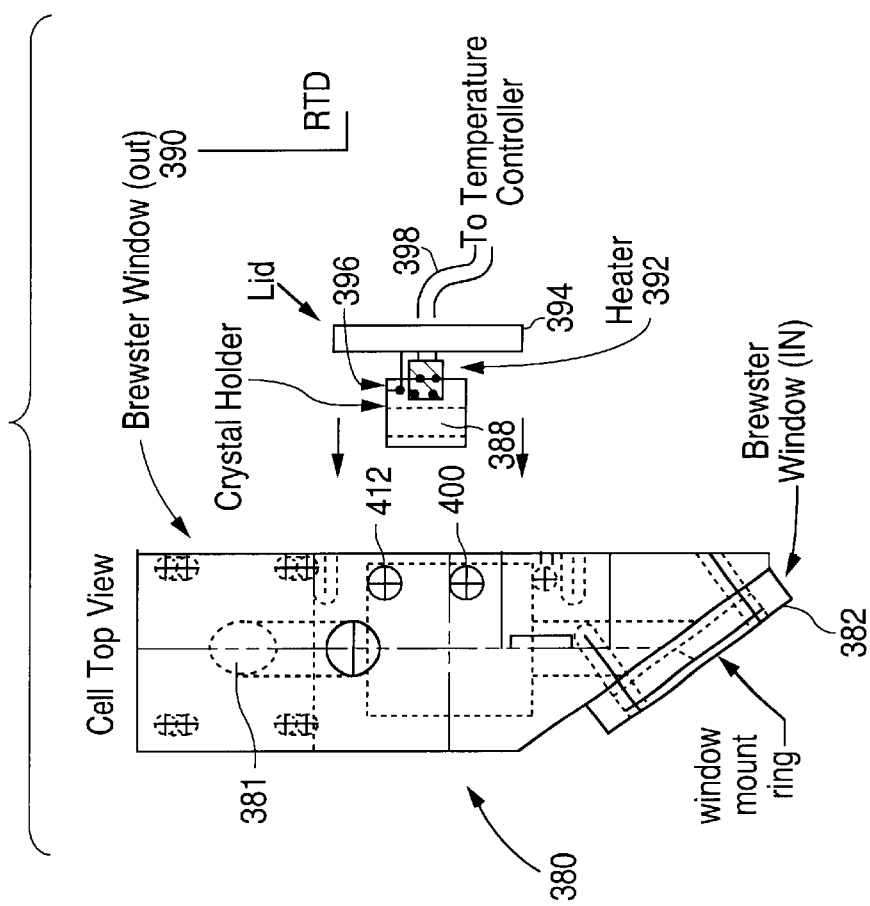
FIG. 8 is a top, exploded view of a preferred housing (cell) for holding a non-linear crystal in accordance with a preferred embodiment.

A housing (cell) 380 of the type which may be used to hold a non-linear crystal 388 in accordance with a preferred embodiment is illustrated at FIG. 8. The housing is preferably formed from a solid block of metal. A bore 381 is formed therein to provide a path for the laser beam. A pair of Brewster windows 382 and 384 are mounted to the ends of the housing.

A non-linear crystal 388 is mounted within a metal holder 390. The holder 390 preferably comprises copper. The holder 390 is mounted to a heater 392. The heater 392 is mounted to a lid 394 which is affixed to the housing. A temperature sensor (RTD) 396 is mounted to the holder 390 for monitoring the temperature of the crystal 388. Electrical wires 398 run out of the housing to a temperature controller (not shown).

The housing is further provided with gas inlet and outlet orifices 400 and 412. The orifices are connectable to a gas supply or evacuation pump. These orifices permit the housing to be purged with inert or dry gas or evacuated in order to remove moisture and increase the life of the non-linear crystal.

Figure 9:
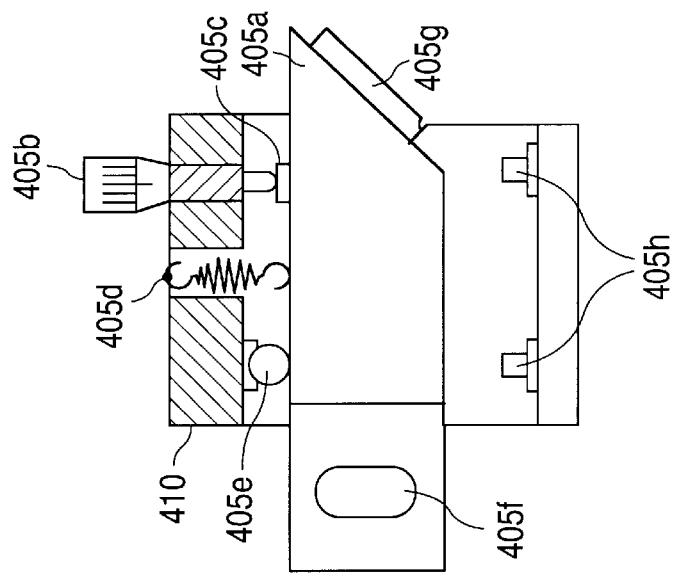
FIG. 9 shows a preferred means for angularly adjusting the crystal orientation within a cell.

FIG. 9 shows a preferred means for angularly adjusting the crystal orientation within the cell 405a. A micrometer screw 405b is pressurably contacted with a hard metal pad 405c which contacts the cell 405a at one end of the cell 405a. The micrometer screw 405b is threadably engaged with a leverage component 410, which lies adjacent to the cell 405a. Near the center of the cell 405a, a spring 405d is attached to the cell and an upper portion of the leverage component 410. A hard metal ball 405e like a ball bearing is contacted with the cell 405a and the leverage component 410 at one end of each. Beam entry and exit windows 405f and 405g are also shown, as are baseplate screws 405h which attach the cell holder to a laser baseplate.

With the hard metal ball 405e acting as a pivot, the micrometer screw 405b applies torque to the cell 405a in the clockwise direction. The complementary spring 405d applies an equivalent torque to the cell 405a in the counterclockwise direction. As the micrometer screw 405b is turned in one direction or the other, the cell is correspondingly rotated. Consequently, the crystal within the cell is orientationally adjustable and flexibility in crystal orientation is provided.

While exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention as set forth in the claims that follow, and equivalents thereof.

In addition, in the method claims that follow, the operations have been ordered in selected typographical sequences. However, the sequences have been selected and so ordered for typographical convenience and are not intended to imply any particular order for performing the operations, except for those claims wherein a particular ordering of steps is expressly set forth or understood by one of ordinary skill in the art as being necessary.

What is claimed is:

1. A laser system, comprising:
   a laser source for emitting an original laser beam at a fundamental frequency;
   an orientationally adjustable nonlinear optical crystal for converting a portion of the original laser beam to a converted beam including a higher harmonic frequency component and outputting a converted output beam;
   a first position sensitive detector and a second position sensitive detector;
   a first spectral filter before the first detector for filtering out the higher harmonic frequency component of the converted beam received at said first detector;
   a second spectral filter before the second detector for filtering out the fundamental component of the converted beam received at said second detector; and
   a controller for receiving a first signal from said first detector wherein said first signal corresponds to the shape and position of the fundamental component, and the controller for receiving a second signal from said second detector, wherein said second signal corresponds to the shape and position of the converted beam signal, wherein the controller is operative to perform a comparison of the first signal and second signal which is indicative of a phase matching error of said beam through said crystal, and the controller is for controlling an orientation of said crystal based on the comparison to substantially a phase matching condition.

2. A laser system, comprising:
   a laser source for emitting an original laser beam at a fundamental frequency;
   a nonlinear optical crystal for converting a portion of the original laser beam to a converted beam including a higher harmonic frequency component and outputting an output beam;
   a temperature controlled cell for housing the nonlinear optical crystal;
   a first position sensitive detector and a second position sensitive detector;
   a first spectral filter before the first detector for filtering out the higher harmonic frequency component of the converted beam received at said first detector;
   a second spectral filter before the second detector for filtering out the fundamental component of the converted beam received at said second detector; and
   a controller for receiving a first signal from said first detector wherein said first signal corresponds to the shape and position of the fundamental component, and the controller for receiving a second signal from said second detector, wherein said second signal corresponds to the shape and position of the converted beam after filtering out the fundamental component, wherein the controller is operative to perform a comparison of the first signal and second signal which is indicative of a phase matching error of said beam through said crystal, and the controller is for controlling a temperature of said crystal within said temperature controlled cell based on the comparison to substantially a temperature-dependent phase matching condition.

3. A laser system, comprising:
   a laser source for emitting an original laser beam at a fundamental frequency;
   a nonlinear optical crystal for converting a portion of the original laser beam to a converted beam including a higher harmonic frequency component and outputting an output beam;
   a temperature controlled cell for housing the nonlinear optical crystal;
   a first position sensitive detector for receiving a portion of the original beam and a second position sensitive detector for receiving a portion of the converted beam;
   a spectral filter before the second detector for filtering out the fundamental component of the converted beam received at said second detector; and
   a controller for receiving a first signal from said first detector wherein said first signal corresponds to the shape and position of the portion of the original beam, and the controller for receiving a second signal from said second detector, wherein said second signal corresponds to the shape and position of the portion of converted beam, wherein the controller is operative to perform a comparison of the first signal and second signal which is indicative of a phase matching error of said beam through said crystal, and the controller is operative for controlling a temperature of said crystal within said temperature controlled cell based on the comparison to substantially a temperature-dependent phase matching condition.

4. A laser system, comprising:
   a laser source for emitting an original laser beam at a fundamental frequency;
   an orientationally adjustable nonlinear optical crystal for converting a portion of the original laser beam to a converted beam including a higher harmonic frequency component and outputting an output beam;
   a first position sensitive detector for receiving a portion of the original beam and a second position sensitive detector for receiving a portion of the converted beam;
   a spectral filter before the second detector for filtering out the fundamental component of the converted beam received at said second detector; and
   a controller for receiving a first signal from said first detector wherein said first signal corresponds to the shape and position of the portion of the original beam, and the controller for receiving a second signal from said second detector, wherein said second signal corresponds to the shape and position of the portion of converted beam, wherein the controller is operative to perform a comparison of the first signal and second signal which is indicative of a phase matching error of said beam through said crystal, and for controlling an orientation of said crystal based on the comparison to substantially a phase matching condition.

5. A laser system, comprising:
   a laser source for emitting an original laser beam at a fundamental frequency;

first and second orientationally adjustable and orientationally modulated nonlinear optical crystals, respectively, for converting a portion of the original laser beam to a converted beam including a higher harmonic frequency component and outputting an output beam and for converting a portion of the output beam from said first nonlinear optical crystal to a second converted beam including two higher harmonic frequency components and outputting a second output beam;

an optical detector for receiving a portion of the second output beam; and a controller for receiving at least one modulated signal from the detector indicative of a phase matching error of said beam through said first and second crystals, and the controller operative to analyze the at least one modulated signal to determine an adjustment for the first and second orientationally adjustable and orientationally modulated nonlinear optical crystals which increases power of the second output beam, and the controller operative for controlling an orientation of each of said first and second crystals based on the adjustment to substantially a phase matching condition.

6. A laser system, comprising:

a laser source for emitting an original laser beam at a fundamental frequency;

first and second temperature-controlled and temperature modulated nonlinear optical crystal cells;

a first nonlinear optical crystal within said first cell for converting a portion of the original laser beam to a converted beam including a higher harmonic frequency component and outputting an output beam;

a second nonlinear optical crystal within said second cell for converting a portion of the output beam from said first nonlinear optical crystal to a second converted beam including two higher harmonic frequency components and outputting a second output beam;

an optical detector for receiving a portion of the second output beam; and a controller for receiving at least one modulated signal from the detector indicative of a phase matching error of the beam through said first and second crystals, and the controller operative to analyze the at least one modulated signal to determine an adjustment in a temperature of the first and second temperature-controlled and temperature modulated nonlinear optical crystals cells, which increases power of the second output beam, and the controller operative for controlling a temperature of each of said first and second crystals within said first and second cells based on the adjustment to substantially a temperature-dependent phase matching condition.

7. A laser system, comprising:

a laser source for emitting an original beam at a fundamental frequency;

at least one orientationally adjustable nonlinear optical crystal for converting said original beam to a converted beam including a higher frequency component;

first and second position sensitive detectors for respectively detecting fundamental and higher frequency harmonic beams; and a controller for receiving a first signal from the first detector wherein said first signal corresponds to the shape and position of the fundamental beam detected by the first detector, and the controller for receiving a second signal from said second detector, wherein said second signal corresponds to the shape and position of the higher frequency harmonic beam detected by the second detector, wherein the controller is operative to perform a comparison of the first signal and second signal which is indicative of a phase matching error and the controller operative for controlling an orientation of the at least one crystal based on the comparison to substantially a phase matching condition.

8. A laser system, comprising:

a laser source for emitting an original beam at a fundamental frequency at least one nonlinear optical crystal housed within a temperature controlled cell for converting said original beam to a converted beam including a higher frequency component;

first and second position sensitive detectors for respectively detecting fundamental and higher frequency harmonic beams; and a controller for receiving a first signal from the first detector wherein said first signal corresponds to the shape and position of the fundamental beam detected by the first detector, and the controller for receiving a second signal from said second detector, wherein said second signal corresponds to the shape and position of the higher frequency harmonic beam detected by the second detector, wherein the controller is operative to perform a comparison of the first signal and second signal which is indicative of a phase matching error and for controlling a temperature of the at least one crystal based on the comparison to substantially a temperature-dependent phase matching condition.

9. A method for controlling a phase matching condition of a beam through a nonlinear optical crystal, comprising the steps of:

generating an original beam at a fundamental frequency;

converting said beam by passing through the nonlinear optical crystal to a converted beam including a higher frequency component;

separating said converted beam into first and second beams;

filtering a fundamental frequency component from the first beam;

filtering a higher frequency component from the second beam;

detecting a shape and a position of the first beam at a first position sensitive detector and generating a first signal corresponding to the shape and position of the first beam;

detecting a shape and a position of the second beam at a second position sensitive detector and generating a second signal corresponding to the shape and position of the second beam;

analyzing the first signal and the second signal to compare the first signal and the second signal; and controlling an orientation of the nonlinear optical crystal based on the comparison between the first signal and the second signal to substantially a phase matching condition.

10. A method for controlling a phase matching condition of a beam through a nonlinear optical crystal, comprising the steps of:

generating an original beam at a fundamental frequency;

converting said beam by passing through the nonlinear optical crystal to a converted beam including a higher frequency component;

separating said converted beam into first and second beams;

filtering a fundamental frequency component from the first beam;

filtering a higher frequency component from the second beam;

detecting a shape and a position of the first beam at a first position sensitive detector and generating a first signal corresponding to the shape and position of the first beam;

detecting a shape and position of the second beam at a second position sensitive detector and generating a second signal corresponding to the shape and position of the second beam;

analyzing the first signal and the second signal to compare the first signal and the second signal; and controlling a temperature of the nonlinear optical crystal based on the comparison between the first signal and the second signal to substantially a temperature-dependent phase matching condition.

11. A method for controlling a phase matching condition of a beam through a nonlinear optical crystal, comprising the steps of:

generating an original beam at a fundamental frequency;

converting said beam by passing through the nonlinear optical crystal to a converted beam including a higher frequency component;

filtering a fundamental frequency component from the converted beam;

detecting a shape and a position of the original beam at a first position sensitive detector and generating a first signal corresponding to the shape and position of the original beam;

detecting a shape and a position of the converted beam at a second position sensitive detector after said filtering and generating a second signal corresponding to the shape and position of the converted beam after said filtering;

analyzing the first signal and the second signal to compare the first signal and the second signal; and controlling an orientation of the nonlinear optical crystal based on the comparison between the first signal and the second signal to substantially a phase matching condition.

12. A method for controlling a phase matching condition of a beam through a nonlinear optical crystal, comprising the steps of:

generating an original beam at a fundamental frequency;

converting said beam by passing through the nonlinear optical crystal to a converted beam including a higher frequency component;

filtering a fundamental frequency component from the converted beam;

detecting a shape and position of the original beam at a first position sensitive detector and generating a first signal corresponding to the shape and position of the original beam;

detecting a shape and position of the converted beam at a second position sensitive detector after said filtering and generating a second signal corresponding to the shape and position of the converted beam after said filtering;

analyzing the first signal and the second signal to compare the first signal and the second signal; and controlling a temperature of the nonlinear optical crystal based on the comparison between the first signal and the second signal to substantially a temperature-dependent phase matching condition.

13. A method for controlling a phase matching condition of a beam through a multistage nonlinear optical crystal arrangement, comprising the steps of:

generating an original beam at a fundamental frequency;

converting said beam by passing through the multistage nonlinear optical crystal arrangement to a converted beam including a higher frequency component;

modulating an orientation of one or more nonlinear optical crystals of the multistage nonlinear optical crystal arrangement based to produce a modulated converted beam including a higher frequency component;

detecting the modulated converted beam at an optical detector; and analyzing changes in the modulated converted beam to determine an adjustment of the orientation of the one or more nonlinear optical crystals of the multistage nonlinear optical crystal arrangement, where the adjustment provides an increase in the power of the converted beam; and controlling an orientation of one or more nonlinear optical crystals of the multistage nonlinear optical crystal arrangement based on the analyzing changes in the modulated converted beam to substantially a phase matching condition.

14. A method for controlling a phase matching condition of a beam through a multistage nonlinear optical crystal arrangement, comprising the steps of:

generating an original beam at a fundamental frequency;

converting said beam by passing through the multistage nonlinear optical crystal arrangement to a converted beam including a higher frequency component;

modulating an orientation of one or more nonlinear optical crystals of the multistage nonlinear optical crystal arrangement based to produce a modulated converted beam including a higher frequency component;

detecting the modulated converted beam at an optical detector;

analyzing changes in the modulated converted beam to determine an adjustment of a temperature of the one or more nonlinear optical crystals of the multistage nonlinear optical crystal arrangement, where the adjustment provides an increase in the power of the converted beam; and controlling a temperature of one or more nonlinear optical crystals of the multistage nonlinear optical crystal arrangement based on the analyzing changes in the modulated converted beam to substantially a temperature-dependent phase matching condition.

15. A method for controlling a phase-matching condition of a beam through at least one nonlinear optical crystal, comprising the steps of:

generating an original beam at a fundamental frequency;

converting the original beam by passing through the at least one nonlinear optical crystal to a converted beam including a higher frequency component;

detecting a fundamental beam and generating a first signal corresponding to the shape and position of the fundamental beam, and detecting a higher frequency harmonic beam, and generating a second signal corresponding to the shape and position of the higher frequency harmonic beam;

analyzing the first signal and the second signal to compare the first signal and the second signal; and controlling an orientation of the at least one nonlinear optical crystal based on the comparison between the first signal and the second signal to substantially a phase-matching condition.

16. A method for controlling a phase-matching condition of a beam through at least one nonlinear optical crystal, comprising the steps of:

generating an original beam at a fundamental frequency;

converting the original beam by passing through the at least one nonlinear optical crystal to a converted beam including a higher frequency component;

detecting a fundamental beam and generating a first signal corresponding to the shape and position of the fundamental beam and detecting a higher frequency harmonic beam and generating a second signal corresponding to the shape and position of the higher frequency harmonic beam;

analyzing the first signal and the second signal to compare the first signal and the second signal; and controlling a temperature of the at least one nonlinear optical crystal based on the comparison between the first signal and the second signal to substantially a temperature-dependent phase-matching condition.

* * * * *